United States Patent [19]

Reed

[11] Patent Number: 4,682,494
[45] Date of Patent: Jul. 28, 1987

[54] AIRFOIL FLUTTER MODEL SUSPENSION SYSTEM

[75] Inventor: Wilmer H. Reed, Hampton, Va.

[73] Assignee: The United States of America as represented by the Administrator of the National Aeronautics & Space Administration, Washington, D.C.

[21] Appl. No.: 890,575

[22] Filed: Jul. 30, 1986

[51] Int. Cl.⁴ ............................................. G01M 9/00
[52] U.S. Cl. ........................................ 73/147; 73/856
[58] Field of Search ................................. 73/147, 856

[56] References Cited

U.S. PATENT DOCUMENTS

| | | | |
|---|---|---|---|
| 1,682,138 | 8/1928 | Merrill | 73/147 |
| 2,448,528 | 9/1948 | Heuver | 73/147 |
| 3,020,754 | 2/1962 | Swanson | 73/147 |
| 3,276,251 | 10/1966 | Reed | 73/147 |
| 3,561,264 | 2/1971 | Needham et al. | 73/147 |
| 3,620,076 | 11/1971 | Heyson | 73/147 |
| 3,695,101 | 10/1972 | Hanson | 73/147 |
| 4,116,056 | 9/1978 | Bulychev et al. | 73/147 |
| 4,475,385 | 10/1984 | Farmer | 73/147 |

Primary Examiner—Donald O. Woodiel
Attorney, Agent, or Firm—George F. Helfrich; John R. Manning

[57] ABSTRACT

The invention is a wind tunnel suspension system for testing flutter models under various loads and at various angles of attack. The invention comprises a mounting bracket assembly 10 affixing the suspension system to the wind tunnel, a drag-link assembly 20 and a compound spring arrangement. The compound spring arrangement comprises plunge spring 18 working in opposition to compressive spring 17 so as to provide a high stiffness to trim out steady state loads and simultaneously a low stiffness to dynamic loads. By this arrangement an airfoil 25 may be tested for oscillatory response in both plunge and pitch modes while being held under high lifting loads in a wind tunnel.

11 Claims, 6 Drawing Figures

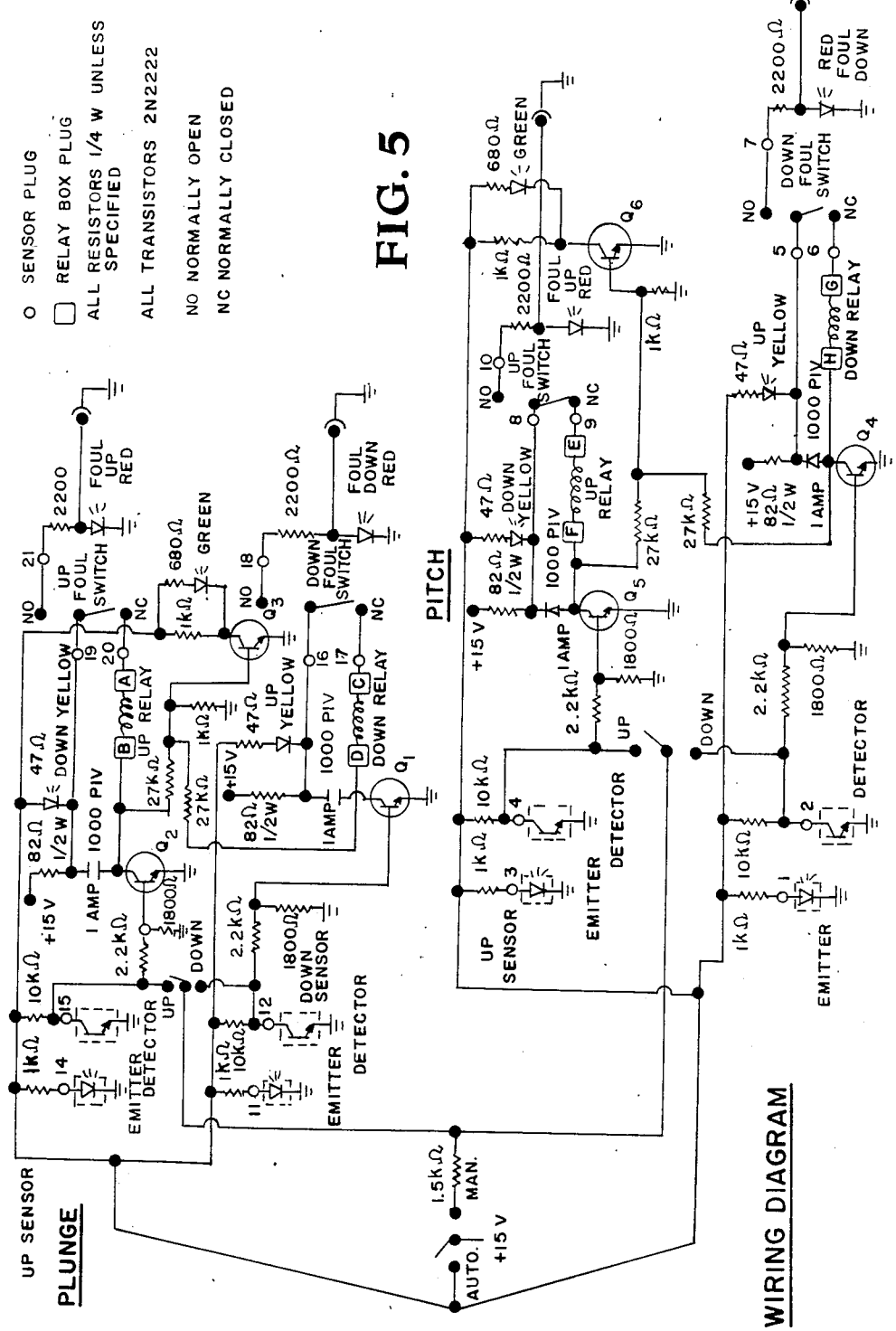

AIRFOIL FLUTTER MODEL SUSPENSION SYSTEM

ORIGIN OF THE INVENTION

The invention described herein was made in the performance of work under NASA Contract NAS1-17686 with DEI-Tech, Inc. In accordance with 35 USC 202, the contractor elected not to retain title.

TECHNICAL FIELD OF THE INVENTION

This invention relates to wind tunnel model suspension systems and more particularly to airfoil support devices suitable for flutter testing.

BACKGROUND OF THE INVENTION

Wind tunnel investigations of the flutter characteristics of airfoils frequently require measurement of small oscillatory motions while the airfoil is under large steady-state loads. As the angle of attack is increased during wind tunnel tests, the steady-state load caused by the lift of the airfoil increases and must be balanced by opposing forces. The opposing forces are provided by the airfoil suspension system. The mass and stiffness properties of the suspension system are dictated by flutter scaling considerations. In general, the suspended, masses must be lightweight in order to simulate realistic mass/air density ratios and the suspension system stiffness low enough that flutter can occur within the wind tunnel operating envelope. Further, the model position in the wind tunnel test section must be maintained for large variations of steady aerodynamic loads. The two oscillatory modes of interest are the pitch mode, involving the twisting about an axis along the span, and the plunge mode involving the up and down flapping motion of the airfoil.

A variety of methods of suspension have been used in an effort to meet these conflicting requirements for low stiffness and high load carrying capability. In contrast, testing for steady-state characteristics, such as lift or drag coefficients, has typically required stiff suspension system to carry the higher loads generated by high lift forces.

It is common practice in wind tunnel flutter tests to set the model at low angles of attack so as to reduce steady state aerodynamic loads and allow soft suspension systems. Unfortunately, flutter is often more critical at higher angles of attack where large steady state forces are also present. Because of this need for flutter model testing at high lift conditions, a novel suspension arrangement was previously developed by the National Aeronautics and Space Administration using a pneumatic cylinder to provide the large steady-state download to react against lift forces on the wind tunnel model. In order to achieve this lift-compensation force without affecting the dynamics of the suspension system, a complex blow-by system was designed into the pneumatic cylinder and two large accumulator-reservoirs were used. Although this suspension does provide for large steady-state loads while retaining proper dynamic characteristics, the complexity and size of the system, along with the considerable volume of compressed gas blow-by necessary to operate the system, results in excessive expense and maintenance and requires lengthy set-up times. In order to avoid these difficulties, a development project was initiated to determine an alternate means of achieving the desired suspension system characteristics. The present invention is a product of that project and is intended to overcome prior art shortcomings. It is, therefore, an object of the present invention to provide a wind tunnel suspension system which can support an airfoil and is adjustable in angle of attack.

Yet another object of the present invention is to incorporate a self-alignment mechanism into the suspension system, permitting the airfoil to remain in a fixed position despite changes in airload.

A further object of the present invention is to have the system provide a soft spring restraint under all steady-state load conditions.

Still another object of the present invention is to provide a compound spring suspension system which will simultaneously provide low plunge stiffness while requiring relatively small static plunge-spring deflections to counteract steady state lift forces and which will permit variable pitch and plunge frequencies, changeable airfoil rotation axes, and a self-aligning system, to maintain a constant mean position of the test model with changing airloads.

SUMMARY OF THE INVENTION

According to the present invention, the foregoing and additional objects are attained by providing a pitch-plunge flutter model suspension system comprising a compound spring and lever or drag link assembly. The system further comprises an orthogonal spring arrangement with vertical and horizontal springs acting on a pair of parallel lever arms extending from wind tunnel wall mounting plate fixtures and connected together so as to allow vertical movement while maintaining an airfoil at a fixed mean angle of attack. The vertically-oriented spring acts downward in tension to oppose the steady-state lift forces. The second spring, horizontally-oriented, acts in compression against the ends of the lever assembly. The pivoting action of the levers translates the horizontal compression force into a vertical force opposing the vertical spring force. By adjustment of the spring loads, large steady-state loads can be accomodated without the need for otherwise large static deflections of the vertical spring.

BRIEF DESCRIPTION OF THE DRAWINGS

A more complete appreciation of the present invention and the many attendant advantages thereof will be readily apparent as the same becomes better understood by reference to the following descriptions when considered in connection with the accompanying drawings wherein:

FIG. 5 is a wiring diagram showing the design of the self-alignment system for maintaining a constant position of the test airfoil within the wind tunnel.

DETAILED DESCRIPTION OF THE INVENTION

Figure 1:
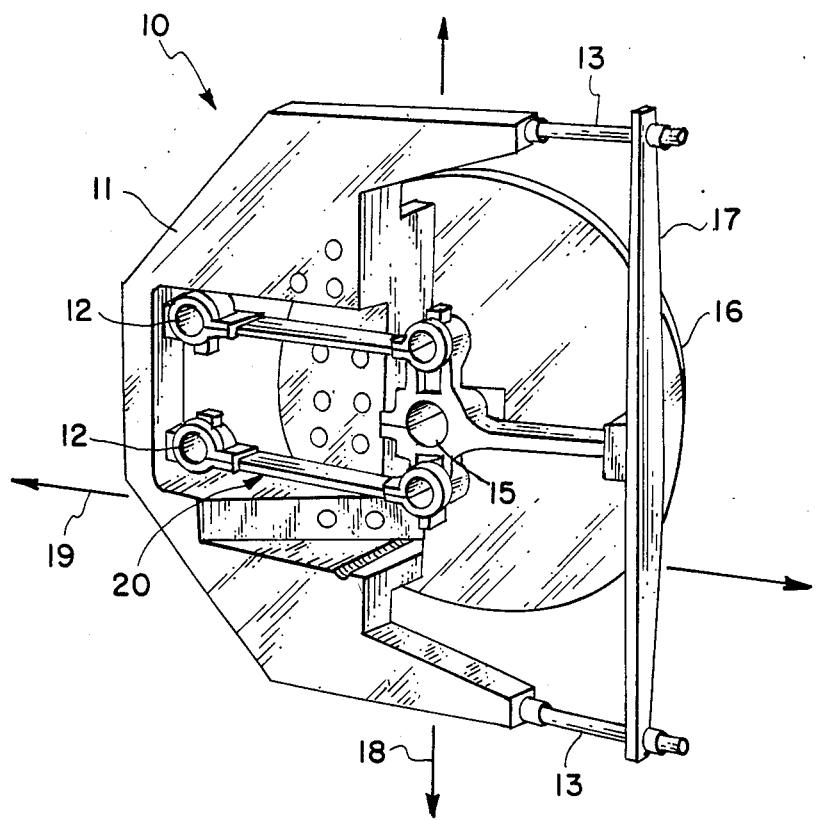
FIG. 1 is a perspective view of the major components of the flutter model suspension system.

Reference is now made to the drawings, wherein like elements are referred to by the same reference numeral throughout the several views, and more particularly to FIG. 1. A perspective view of the primary components of the wind tunnel suspension is designated generally by the numeral 10. The preferred embodiment described herein was designed for use in mid-size transonic blow-down tunnels. The present invention was designed for test in a 6×28 inch tunnel with stagnation pressures independently controllable in a range from 2 to 6 atmospheres, and Mach numbers in a range from 0.5 to 1.0 with the Reynolds number held constant up to $10 \times 10^6$ for a 6.0 inch model chord. The suspension system is mounted with a C-bracket 11 with pivotable attachment points 12 for the drag-link assembly, designated generally by the numeral 20, and adjustable attachment points 13 for the compressive spring 17 make up the mounting bracket assembly, which is fixed to the outside of a wind tunnel. Pivotable attachment points 12 are also adjustable vertically such that the drag link assembly may be configured in a parallelogram arrangement or a triangular arrangement or intermediate positions between these two configurations. As configured in FIG. 1, the drag-link assembly 20 moves within the cut-out of the C-Bracket 11. The parallelogram configuration prevents rotation of the model due to vertical motion. A triangular or more triangular configuration causes rotation about a pivot axis located forward of the airfoil. Other major components include the circular end plate 16, the compressive spring 17 the plunge spring cable 18, and the pitch spring cable 19.

Figure 2:
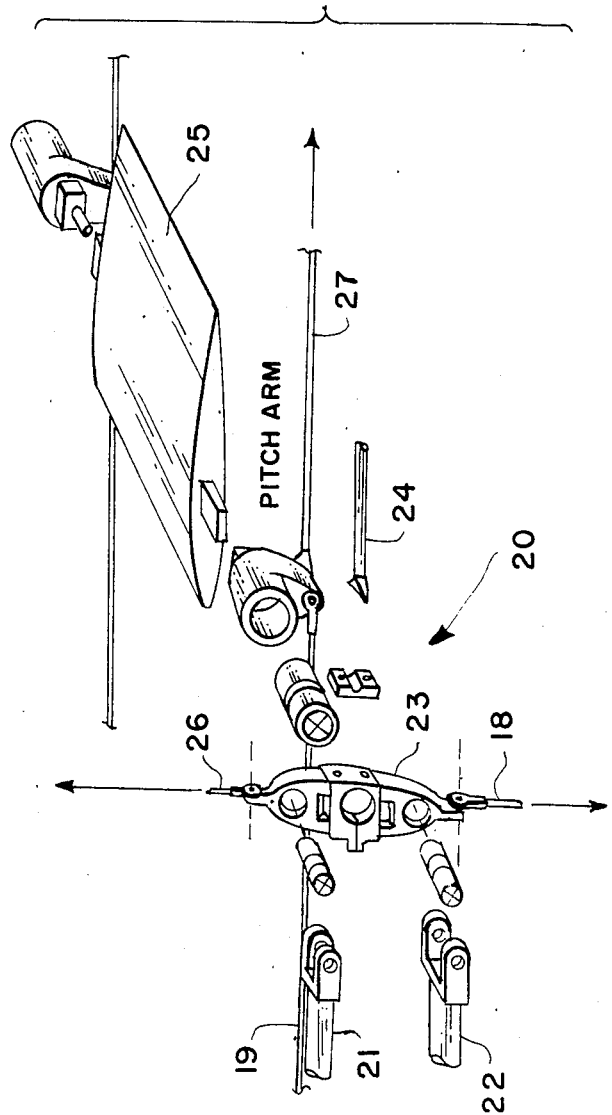
FIG. 2 is an exploded view of the drag-link assembly with an attached test airfoil.

Further details of the drag-link assembly 20 can be seen in the exploded view of FIG. 2. The forward drag-link upper arm 21 and lower arm 22 are pivotally connected to a vertically-oriented link 23 which is also pivotally connected to the compressive link 24, in the preferred embodiment by a knife-edge bearing in order to minimize friction. Plunge spring cable 18 opposes airfoil 25 lift and plunge pre-tension cable 26. Pitch pre-tension cable 27 is balanced by adjustable pitch spring cable 19. Pitch motion about a pivotable attachment 15 is independent of plunge features so that oscillatory pitch motions and frequency are not affected by plunge mechanism adjustments or tension. Increasing compression on compressive link 24, however, creates an equivalent negative spring force which increases the apparent softness of the plunge spring.

Figure 3:
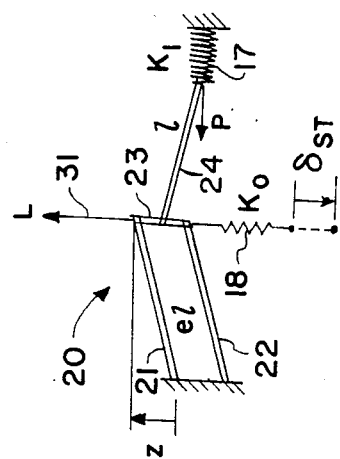
FIG. 3 is a schematic representation of the compound spring arrangement of the present invention.

This compressive spring effect may be further explained by reference to FIG. 3, a schematic showing the operation of the compound spring mechanism. In this Figure the drag-link assembly 20 is depicted with plunge spring 18 opposing lift 31. Increases in compressive force by compressive spring 17 against compressive link 24 causes an upward force opposing the plunge download and augmenting lift. By increasing compressive load, the net stiffness can be made arbitrarily small.

The horizontal spring, $K_1$, is preloaded to produce a controllable compressive force, P, in the rigid links. When the joined end of the links is displaced vertically through a distance z, as shown, these compressive forces act in the same direction as the displacement and thereby function as a negative stiffness tending to cojtneract the postive stiffness, $K_o$, in the axial spring. The net stiffness in the z direction is, for small z deflections, given by the equation:

$$\frac{dL}{dz} = K_z = K_o(1 - P/P_c)$$

where
L = lift force, lbs
l = length of compression link
z = Plunge mode displacement, in
$K_z$ = Effective spring constant for plunge spring
$K_0$ = Spring constant of compressive spring
P = Compression spring force, lb
e = length ratio of upstream to downstream drag-links $$P_c = K_o l \frac{(e)}{1 + e}$$

$$\delta_{ST} = \text{static deflection}, \frac{L}{K_o}$$

$P_c$ is the critical compressive force at which the system becomes statically unstable (analogous to the critical load in column buckling). Therefore, by varying the compressive force in the links, the effective stiffness, $K_z$, can be varied from a maximum value of $K_o$ to a minimum approaching zero. An important feature of the compoundspring system is that the static deflection, $\delta_{ST}$, needed to counteract a given load depends only on the stiffness of the spring $K_o$, irrespective of the system lower-valued effective the stiffness of that spring. By contrast, the static deflection of a single linear spring system varies inversely with stiffness.

Figure 4:
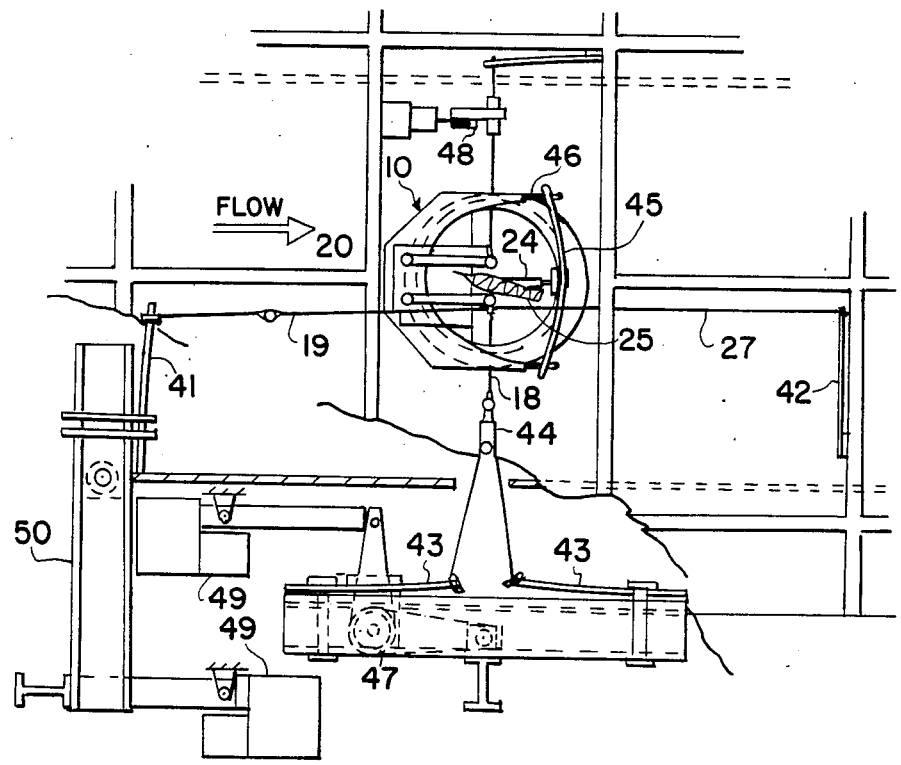
FIG. 4 is a side view showing the installation of the flutter model, suspension system in a 6×28 inch wind tunnel.
Figure 5A:
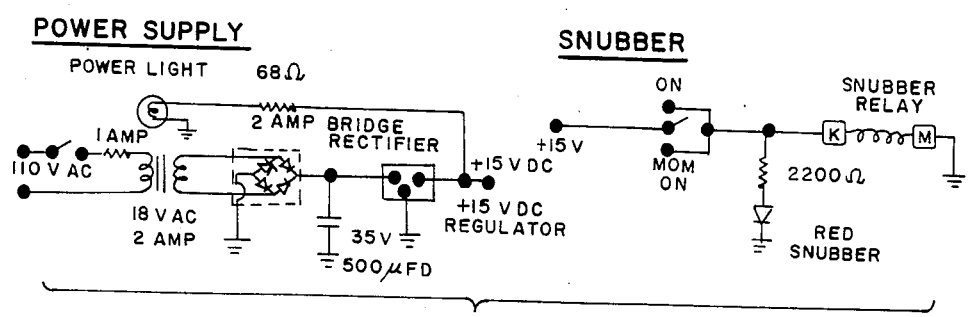
FIG. 5a is a continuation of the wiring diagram shown in FIG. 5.

Referring now to FIG. 4, the flutter model suspension system is shown as installed in a transonic blowdown tunnel. The mounting bracket assembly 10 with the drag-link assembly 20 is shown as attached to the wind tunnel. Pitch cable 19 is attached to a cantilever leaf spring 41. Pitch pretension is provided by cable 27 and cantilever leaf spring 42 acting in opposition to spring 41. Airfoil model 25 is shown inclined at a positive angle-of-attack. Dual plunge springs 43 are attached to the plunge download cable 18 via a pulley-cable arrangement 44. The compressive spring 45 acts against rear drag-link 25 to provide plunge stiffness adjustment. Snubbers 48 damp excess flutter motion to compensate for mass effects on flutter frequency response. At the lower part of the figure, actuators 49 operate to adjust static download through mechanism 47 and the static pitch moment through mechanism 50 in order to maintain model vertical and pitch angle position within the tunnel during varying airloads. This self-alignment system may be operated in either a manual mode, allowing full manual control over airfoil pitch and plunge position, or in an automatic mode which automatically maintains the airfoil in a previously established neutral position. The airfoil is positioned and balanced in the neutral zone by means of two 1500 lb. linear electric-motor-driven actuators. These actuators provide airfoil pitch variations of ±5° and plunge variations of ±0.5 inches. Each actuator is independently controlled and operated via a control box. The actuators also maintain position by counteracting the static lift and pitching airloads. Details of the control box, control panel layout, and a complete circuit diagram for the control system electronics are contained in FIGS. 5 and 5a. To avoid the addition of damping, non-contacting optical sensors are used to sense the airfoil positions. The optic sensors are operational in automatic mode and provide signals to engage the appropriate actuator and drive the airfoil back to the neutral position. The control panel indicators, also operational in automatic mode, indicate general airfoil position and operational status of actuators. Foul lights are provided to signal the airfoil contacting the stops. Foul indicators are operational in either manual or automatic modes.

The control box contains the snubber actuation switch and snubber indicator light. The snubber is provided as a manual flutter suppression system.

Although the invention described herein is related to a specific embodiment, the invention is not to be limited by those specifics. Numerous modifications and variations are possible and will be readily apparent to those skilled in the art. It is understood therefore that within the scope of the appended claims, the invention maybe practiced otherwise than as specifically described herein.

What is claimed as new and desired to be secured by Letter Patent of the United States is:

1. A wind tunnel model suspension system for testing flutter comprising:
   a mounting bracket assembly for attaching the suspension system to the outside of a wind tunnel;
   a drag-link assembly having a forward end pivotally attached to said mounting bracket assembly and having a rearward end configured for attachment of an airfoil test model;
   pitch springs attached to said drag-link assembly allowing pitch oscillation at low stiffness;
   plunge springs attached to said drag-link assembly providing a low stiffness system that will accommodate large steady lift forces without the need for large static spring deflections to counteract such forces;
   a compression spring attached to said drag-link assembly and acting in opposition to said plunge springs so as to allow adjustment of plunge stiffness;
   whereby an airfoil may be tested at various angles-of-attack and airloads while maintaining low resistance to pitch and plunge flutter modes.

2. A wind tunnel model suspension system as in claim 1, further comprising an end plate attached to the rearward end of said drag-link assembly, whereby the airflow inside the tunnel is isolated from the suspension system.

3. A wind tunnel model suspension system as in claim 1, further comprising a self-alignment mechanism attached to said plunge springs and providing adjustment of plunge spring tension, whereby a constant mean position of a model within the tunnel can be maintained.

4. A wind tunnel model suspension system as in claim 1, further comprising snubbers functionally connected to said drag link assembly, whereby excessive flutter motion is damped.

5. A wind tunnel model suspension system as in claim 1, wherein said mounting bracket assembly comprises a C-bracket having mounting points such that said drag link assembly is mounted in a parallelogram configuration providing pure translation or plunge motion to a test model.

6. A wind tunnel model suspension system as in claim 5, wherein said drag link assembly is mounted in a triangular configuration providing rotational or pitch motion to a test model.

7. A wind tunnel model suspension system as in claim 1, wherein said drag-link assembly comprises upper and lower links pivotally attached to said mounting bracket assembly and extending rearwardly to a pivotal attachment at upper and lower ends respectively of a vertically-oriented link.

8. A wind tunnel model suspension system as in claim 7, wherein said drag-link assembly further comprises a rearward-extending link pivotally attached to the center of the vertical link, whereby compressive force exerted horizontally against said rearward-extending link is translated through the buckling action of the pivots into upward force.

9. A wind tunnel model suspension system as in claim 1, wherein said pitch springs comprise an adjustable forward-acting leaf spring and a rearward-acting pretension leaf spring connected by cables to a pivotally-mounted lever arm attached to a test model.

10. A wind tunnel model suspension system as in claim 1, wherein said plunge springs comprise an upward acting pre-tension leaf spring and a plurality of adjustable downward acting leaf springs connected by cables to the rearward end of said drag link assembly.

11. A wind tunnel model suspension system as in claim 1, wherein said compression spring is a leaf spring adjustably attached across the mounting bracket assembly and providing a compressive force forward against the drag link assembly.

* * * * *